Figure 1:
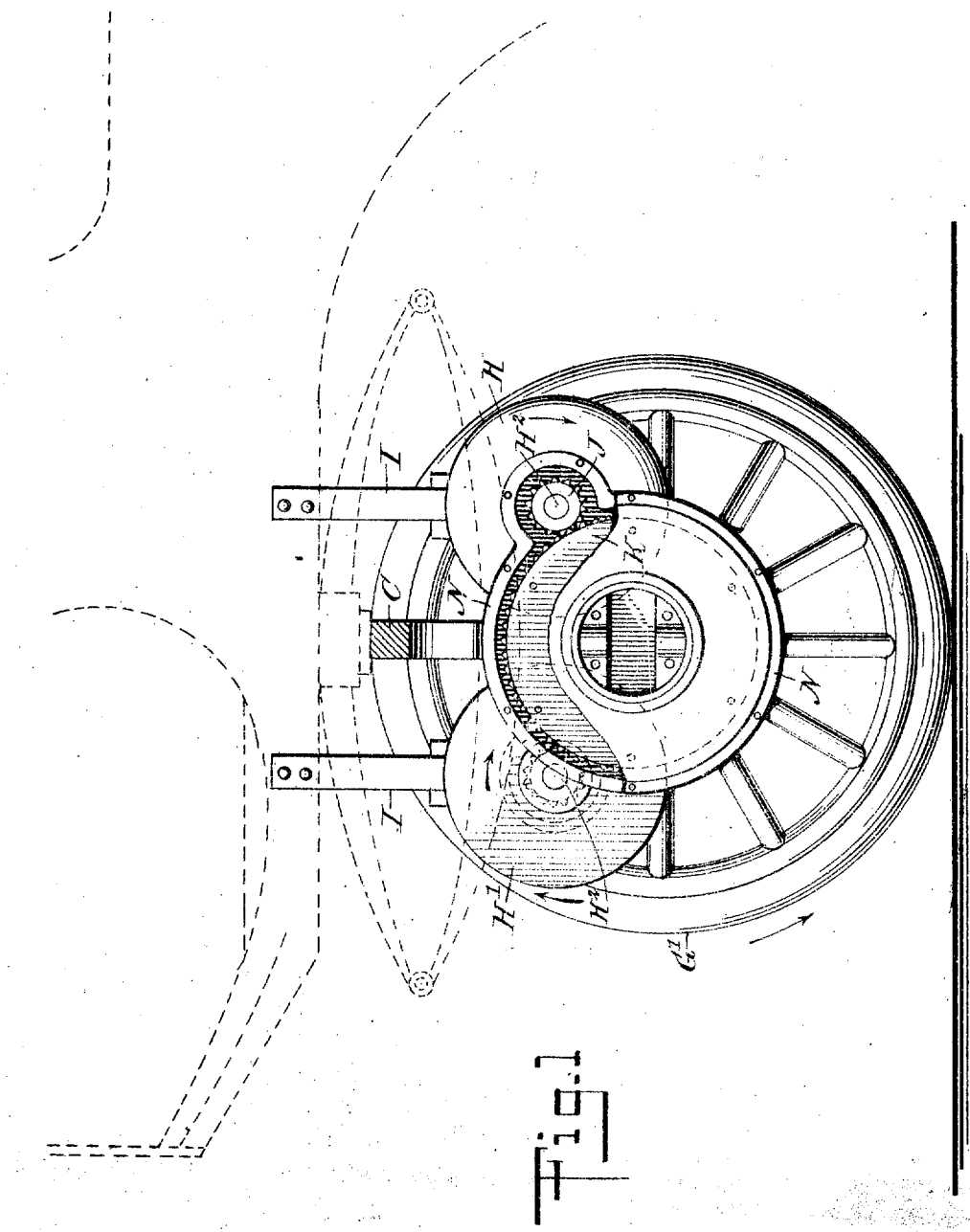

No. 891,152. PATENTED JUNE 16, 1908.
W. H. DOUGLAS.
DRIVING MECHANISM FOR MOTOR VEHICLES.
APPLICATION FILED OCT. 9, 1907.

5 SHEETS—SHEET 1.

WITNESSES
INVENTOR
William H. Douglas
BY
ATTORNEYS

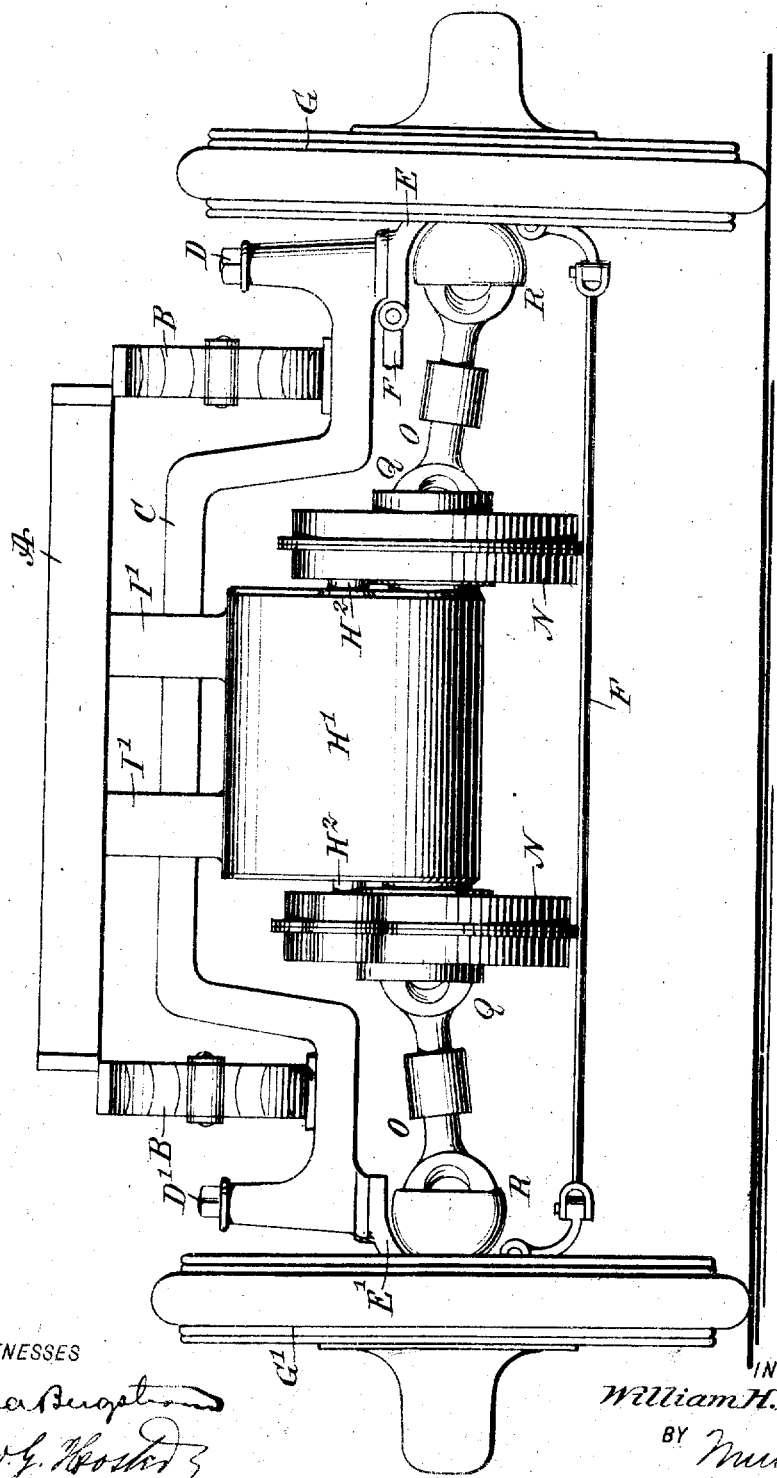

No. 891,152. PATENTED JUNE 16, 1908.
W. H. DOUGLAS.
DRIVING MECHANISM FOR MOTOR VEHICLES.
APPLICATION FILED OCT. 9, 1907.
5 SHEETS—SHEET 3.
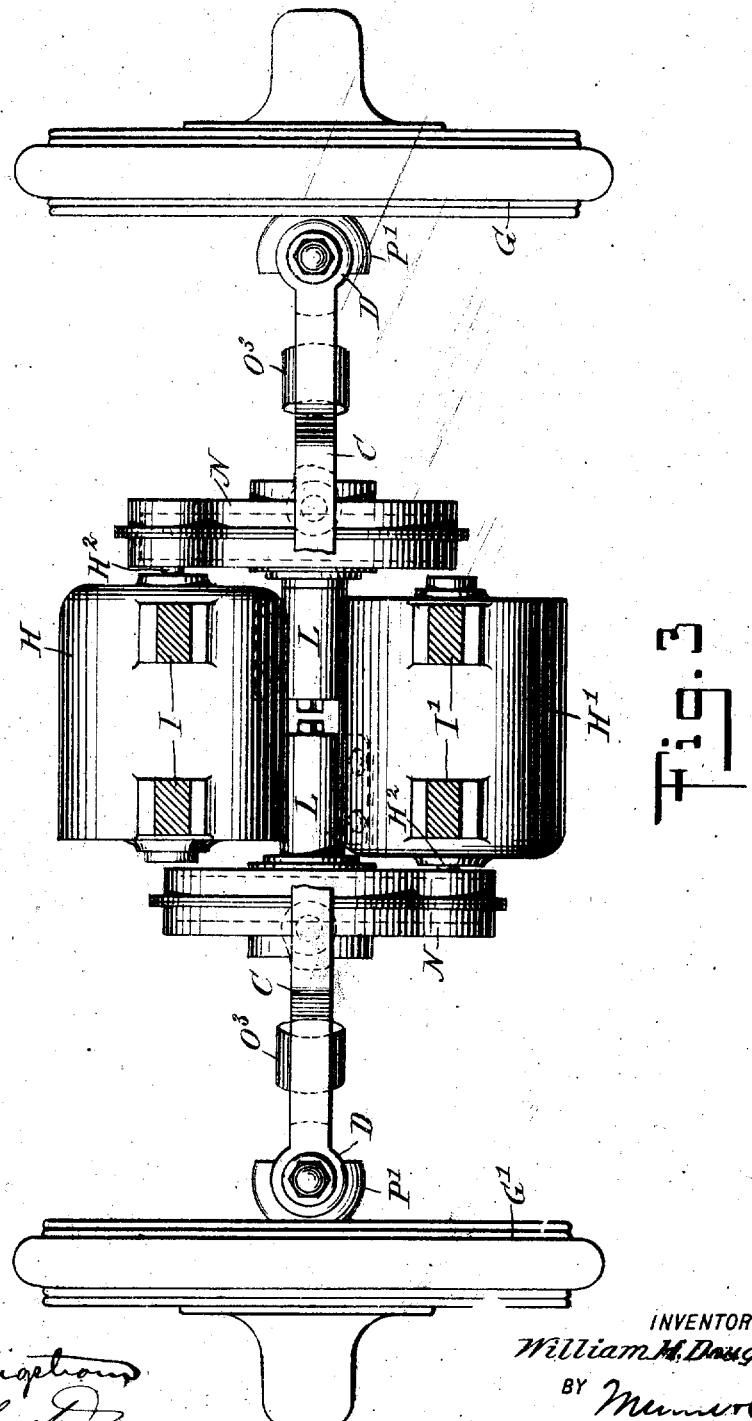
WITNESSES
INVENTOR
William H. Douglas
BY
ATTORNEYS

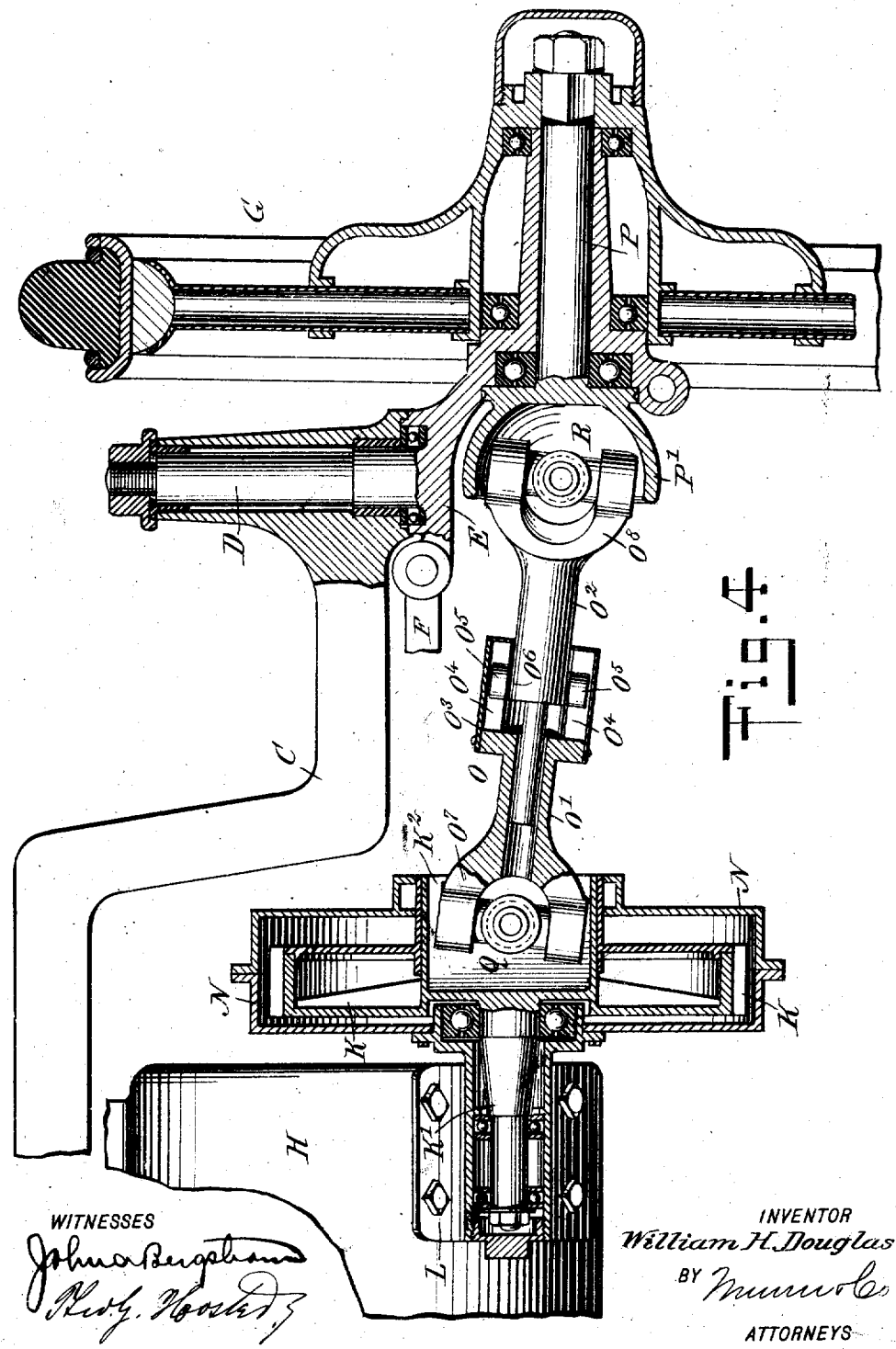

No. 891,152. PATENTED JUNE 16, 1908.
W. H. DOUGLAS.
DRIVING MECHANISM FOR MOTOR VEHICLES.
APPLICATION FILED OCT. 9, 1907.
5 SHEETS—SHEET 5.
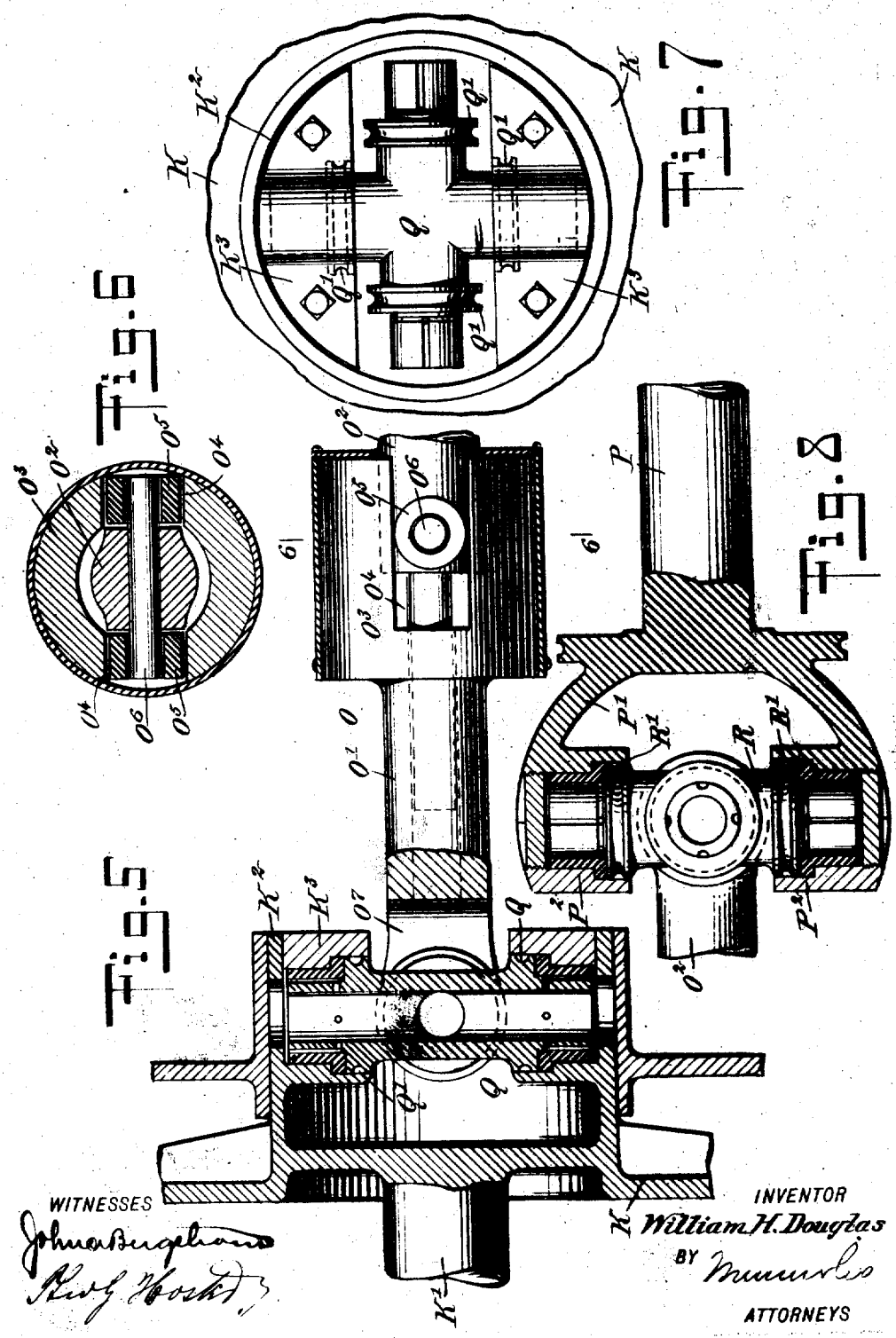
WITNESSES
INVENTOR
William H. Douglas
BY
ATTORNEYS

UNITED STATES PATENT OFFICE.

WILLIAM HENRY DOUGLAS, OF BELLEVILLE, NEW JERSEY, ASSIGNOR TO HEALEY & CO., OF NEW YORK, N. Y., A CORPORATION.

DRIVING MECHANISM FOR MOTOR-VEHICLES.

No. 891,152.     Specification of Letters Patent.     Patented June 16, 1908.

Application filed October 9, 1907. Serial No. 396,605.

*To all whom it may concern:*

Be it known that I, WILLIAM HENRY DOUGLAS, a citizen of the United States, and a resident of Belleville, in the county of Essex and State of New Jersey, have invented a new and Improved Driving Mechanism for Motor-Vehicles, of which the following is a full, clear, and exact description.

The object of the invention is to provide a new and improved driving mechanism for motor vehicles, arranged to drive traction wheels independently from different motors, to allow yielding of the vehicle body relative to either traction wheel, without disturbing or affecting the independent driving mechanisms for the traction wheels.

The invention consists of novel features and parts and combinations of the same, which will be more fully described hereinafter and then pointed out in the claims.

A practical embodiment of the invention is represented in the accompanying drawings forming a part of this specification, in which similar characters of reference indicate corresponding parts in all the views.

Figure 1 is a side elevation of the improvement as applied to an automobile, parts being in section; Fig. 2 is a front elevation of the same; Fig. 3 is a sectional plan view of the same; Fig. 4 is an enlarged cross section of the improvement; Fig. 5 is an enlarged sectional plan view of the universal joint connection between one of the driven gear wheels and the connecting driving shaft for the traction wheel shaft; Fig. 6 is a sectional side elevation of the same on the line 6—6 of Fig. 5; Fig. 7 is a side elevation of one of the driven gear wheels and the universal joint mounted in the gear wheel, and Fig. 8 is an enlarged sectional plan view of the universal joint connecting one of the driven shafts with the corresponding traction wheel shaft.

The body A of the motor vehicle is mounted on springs B supported on the main axle C, having vertically disposed pivots D, D' for stub axles E, E' to turn on, the said stub axles E, E' being connected with each other by a link F and being controlled by the usual steering gear of the motor vehicle, and on the said stub axles are mounted to turn the front or traction wheels G, G'.

Two motors H, H' of any approved construction are suspended by brackets I, I' from the vehicle body A, and the said motors serve to drive the traction wheels G, G', independently one of the other, by mechanisms alike in construction, so that it suffices to describe but one in detail.

On the shaft $H^2$ of each motor H, H' is secured a pinion J in mesh with a gear wheel K, having its shaft K' journaled in a suitable bearing L attached to the corresponding motor H or H'. A casing N supported by the bearing L incloses and protects the gear wheel K and the pinion J, as plainly indicated in the drawings. The hub $K^2$ of the gear wheel K is connected by a connecting shaft O with the wheel shaft P, on which the corresponding traction wheel G or G' is secured, the said connecting shaft O being connected by a universal joint Q with the said hub $K^2$, and by a universal joint R with the inner cup-shaped head P' of the shaft P.

The connecting shaft O is made in two sections O', $O^2$, telescoping one in the other, the section O' having a head $O^3$, provided with longitudinally extending slots $O^4$, engaged by friction rollers $O^5$, journaled on studs $O^6$, held on the shaft section $O^2$. Thus by the arrangement described, the sections O', $O^2$ are free to slide or telescope one on the other, and at the same time the sections O', $O^2$ turn in unison.

The universal joints Q and R are preferably in the form of crosses, as plainly indicated in the drawings, one arm of the universal joint Q being journaled in bearings $K^3$ attached to the hub $K^2$ of the gear wheel K, and one arm of the universal joint R being journaled in bearings $P^2$, arranged on the cup-shaped head P' of the shaft P. The other arm of the universal joint Q is pivotally connected with a fork $O^7$ formed on the inner end of the shaft section O', and the other arm of the universal joint R is pivotally connected with a fork $O^8$ formed on the outer end of the shaft section $O^2$ (see Fig. 4).

Now by the arrangement described an exceedingly flexible connection is had between the gear wheel K and the corresponding wheel shaft P, to compensate for the yielding motion between the vehicle body A and the axle C, especially when the vehicle travels over rough roads. By the arrangement described, the gearing shaft O is free to lengthen or to shorten according to the motion of the wheel G or G' relative to the vehicle body A, and the universal joints Q and R permit free turning of the wheels G or G' in either direction without undue binding, so that the power of the motors is properly transmitted to the traction wheels G and G'.

The crosses forming the universal joints Q and R are preferably made hollow, as plainly indicated in Fig. 5, to form lubricant receptacles for lubricating the crosses in their bearings K³, P² in their connections with the forks O⁷, O⁸ of the shaft O. The crosses forming the universal joints Q and R are also provided with grooved collars Q', R' extending in the bearings K³, P², and filled with a packing, to completely exclude dust from the said bearings K³ and P².

It is understood that by arranging the motors H and H' one in front of the other and with their shafts H² extending transversely parallel to each other and in the same horizontal plane, it is possible to mount and use powerful motors on the vehicle body, without unduly widening the traction base of the vehicle and without taking up too much room, and allowing a compact arrangement of the driving gear.

By arranging the pinions H² and gear wheels K at opposite ends of the motors, as shown, the transverse axes of the gear wheels K are caused to coincide and to lie in a vertical plane passing through the axle C and the pivots D, D' for the stub axles E, E'.

Having thus described my invention, I claim as new and desire to secure by Letters Patent:

1. A driving mechanism for motor vehicles, comprising two motors, gear wheels driven from the said motors, connecting shafts having universal joint connections with the said gear wheels, and traction wheel shafts to which the traction wheels are secured and having universal joint connections with the said connecting shafts.

2. A driving mechanism for motor vehicles, comprising motors mounted on the vehicle body, gear wheels independently journaled on the motor casings and in mesh with pinions on the motor shafts, connecting shafts rotating with the said gear wheels, and traction wheel shafts rotating with the said connecting shafts, each of the said connecting shafts being yieldable in direction of length having a universal joint connection with the hub of the corresponding gear wheel and a universal joint connection with the corresponding wheel shaft.

3. A driving mechanism for motor vehicles, comprising motors mounted on the vehicle body, gear wheels independently journaled on the motor casings and in mesh with pinions on the motor shafts, connecting shafts rotating with the said gear wheels, and each made in sections capable of sliding one on the other, and traction wheel shafts rotating with the said connecting shafts.

4. A driving mechanism for motor vehicles, comprising motors mounted on the vehicle body, gear wheels independently journaled on the motor casings and in mesh with pinions on the motor shafts, connecting shafts rotating with the said gear wheels, and traction wheel shafts rotating with the said connecting shafts, each of the said connecting shafts being made in sections capable of sliding one on the other, and each connecting shaft having a universal joint connection with the hub of the corresponding gear wheel, and a universal joint connection with the corresponding wheel shaft.

5. A driving mechanism for motor vehicles, comprising a motor, a gear wheel driven by the said motor, a wheel shaft carrying a traction wheel, and a connecting shaft having universal joint connections with the said wheel and with the said traction wheel, the said connecting shaft being made in sections, one of the sections having a slotted head and the other section having a sliding connection with the said head, and friction wheels engaging the slots in the head.

6. In a driving mechanism for motor vehicles, the combination of a vehicle body, pivoted stub axles, traction wheels mounted on the axles, shafts to which the wheels are secured, motors mounted on the body, gear wheels driven from the motors, and connecting shafts having universal joint connections with the said gear wheels and the wheel shafts.

7. In a driving mechanism for motor vehicles, a motor having a pinion on its shaft, a gear wheel meshing with the pinion and having a tubular hub, a wheel shaft to which the wheel is secured, having a cup shaped head, and a shaft having one end connected by a universal joint with the hollow hub of the said gear wheel and its other end with the cup-shaped head of the wheel shaft.

8. In a driving mechanism for motor vehicles, a motor having a pinion on its shaft, a gear wheel meshing with the pinion, a casing inclosing the pinion and gear wheel, a wheel shaft, and a connecting shaft having a universal joint connection with the hub of the gear wheel and the wheel shaft.

9. In a driving mechanism for motor vehicles, a motor, gear wheels driven from the motor, a wheel shaft, and a connecting shaft formed of sections slidably connected together, said shaft having a universal joint connection with the gear wheels and the wheel shaft.

In testimony whereof I have signed my name to this specification in the presence of two subscribing witnesses.

WILLIAM HENRY DOUGLAS.

Witnesses:
AUGUSTUS S. BASSETT,
C. D. CLARKER.